United States Patent
Wu et al.

(10) Patent No.: US 9,063,862 B2
(45) Date of Patent: Jun. 23, 2015

(54) EXPANDABLE DATA CACHE

(75) Inventors: William Wu, Cupertino, CA (US); Sergey Anatolievich Gorobets, Edinburgh (GB); Steven Sprouse, San Jose, CA (US); Alan Bennett, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 179 days.

(21) Appl. No.: 13/109,777

(22) Filed: May 17, 2011

(65) Prior Publication Data

US 2012/0297140 A1 Nov. 22, 2012

(51) Int. Cl.
*G06F 12/00* (2006.01)
*G06F 12/08* (2006.01)

(52) U.S. Cl.
CPC ........ *G06F 12/0871* (2013.01); *G06F 12/0897* (2013.01); *G06F 2212/2022* (2013.01); *G06F 2212/214* (2013.01); *G06F 2212/2515* (2013.01); *G06F 2212/466* (2013.01); *G06F 2212/6012* (2013.01)

(58) Field of Classification Search
USPC ........................... 711/117, 118, 119, 126, 133
See application file for complete search history.

(56) References Cited

U.S. PATENT DOCUMENTS

| | | | | |
|---|---|---|---|---|
| 6,961,818 | B1 * | 11/2005 | Sade et al. | 711/119 |
| 7,080,208 | B2 * | 7/2006 | Ashmore et al. | 711/136 |
| 7,181,572 | B2 | 2/2007 | Walmsley | |
| 8,234,478 | B1 * | 7/2012 | Roberts et al. | 711/167 |
| 8,327,069 | B2 * | 12/2012 | Moritoki | 711/119 |
| 2008/0183949 | A1 | 7/2008 | Ly et al. | |
| 2008/0244164 | A1 | 10/2008 | Chang et al. | |
| 2009/0043959 | A1 * | 2/2009 | Yamamoto | 711/112 |
| 2010/0172180 | A1 | 7/2010 | Paley et al. | |
| 2011/0093654 | A1 * | 4/2011 | Roberts et al. | 711/105 |

OTHER PUBLICATIONS

Pepijn de Langen and Ben Juurlink, "Limiting the Number of Dirty Cache Lines" © 2009, European Design and Automation Association, DATE '09 Proceedings of the Conference on Design, Automation and Test in Europe, pp. 670-675.*

* cited by examiner

*Primary Examiner* — Jared Rutz
*Assistant Examiner* — Christopher Do
(74) *Attorney, Agent, or Firm* — Brinks Gilson & Lione

(57) ABSTRACT

A method and system for cache management in a storage device is disclosed. A portion of unused memory in the storage device is used for temporary data cache so that two levels of cache may be used (such as a permanent data cache and a temporary data cache). The storage device may manage the temporary data cache in order to maintain clean entries in the temporary data cache. In this way, the storage area associated with the temporary data cache may be immediately reclaimed and retasked for a different purpose without the need for extraneous copy operations.

26 Claims, 7 Drawing Sheets

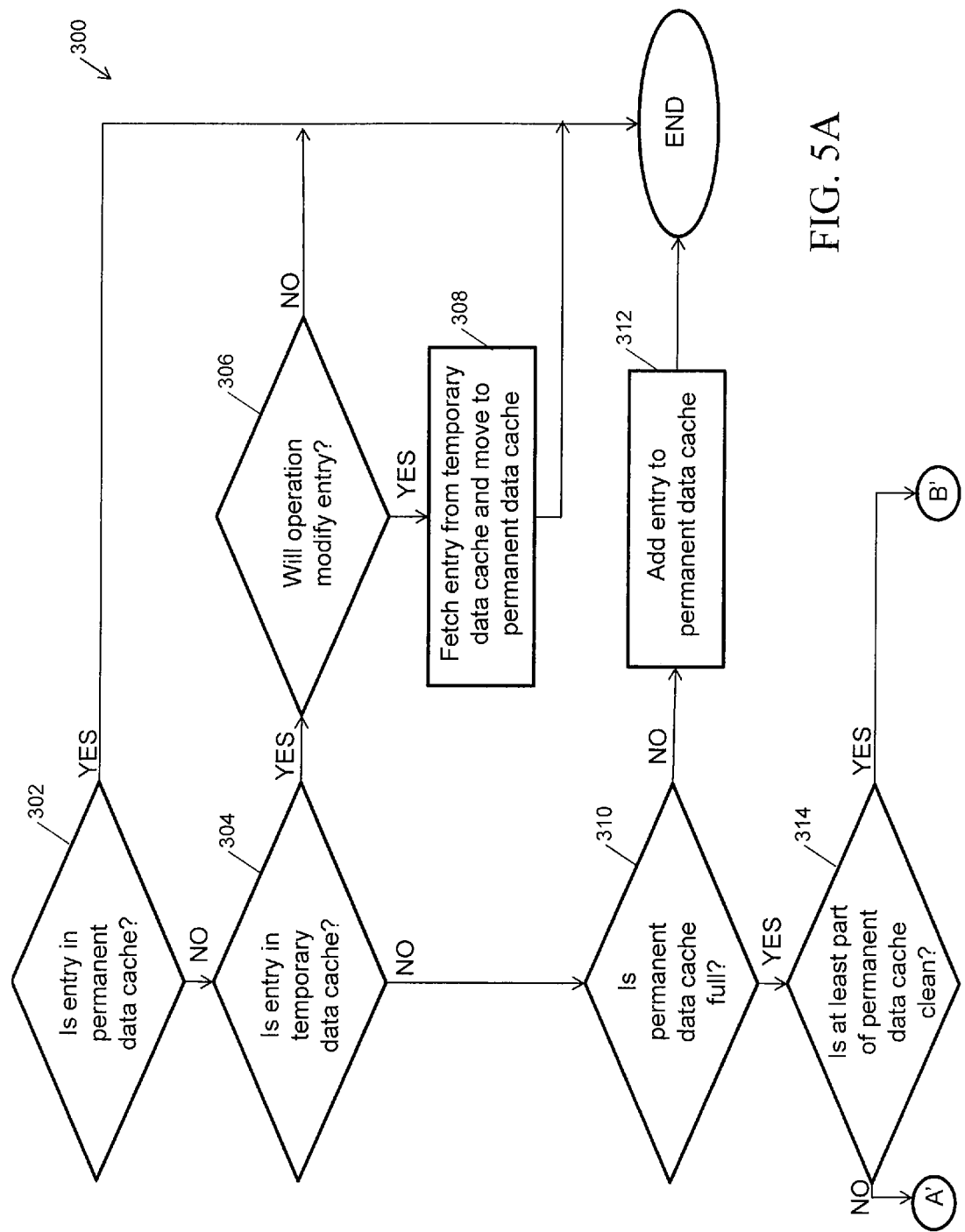

EXPANDABLE DATA CACHE

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device.

Some flash memory management systems employ self-caching architectures for data buffering and data caching. For example, caching may be used for data buffering where data received from the host device is first stored in a portion of the memory designated as the cache and is later copied to a portion of the flash memory designated as a main storage area (such as a multi-level cell (MLC) type flash memory). As another example, caching may be used for control data storage to improve operation time.

One way to configure the memory for caching is to assign a fixed permanent portion of the on-chip memory for data buffering and control data caching. The size of the fixed permanent portion is selected to be large enough to handle corner cases, such as large sequential accesses or error cases, resulting in an over-provisioning of the data buffer/cache. This over-provisioning runs directly contrary to typical cost-constraints for flash memory controller design since the amount of on-chip memory for data buffering and control data caching is typically limited.

Another way to configure the memory for caching is to assign a temporary control data cache. However, using a temporary control data cache has problems when the memory is reclaimed for another use. Thus, what is needed is a more efficient or easier way to manage a data cache.

SUMMARY

In order to address the problems noted above, a method and system for cache management is disclosed. According to a first aspect of the invention, a storage device is disclosed that includes at least one memory and a controller in communication with the memory. The controller is configured to: allocate a first area in the at least one memory as a first data cache for caching data of a first data type; allocate a second area in the at least one memory as a second data cache for caching data of the first data type, the second data cache being separate from the first data cache and being a temporary data cache; and reclaim the second area in the at least one memory for use other than for caching data of the first type. For example, the controller may configure the first area as a permanent data cache and the second area as a temporary data cache for the first type of data (such as control data or host data), thereby configuring two levels of cache. The controller may allocate the second area for the temporary data cache if the second area is not being used. The second area (used for the temporary data cache) may be a shared memory region, and may be allocated as the temporary data cache or for another purpose (such as buffering, transferring, etc.).

The controller is further configured to manage entries in the temporary data cache so that the entries in the temporary data cache are clean. A "clean" entry accurately reflects the contents of another part of the memory on the storage device (such as in flash memory or other non-volatile memory) whereas a dirty entry does not accurately reflect the contents of another part of the memory on the storage device. Typically, when an entry is loaded into the cache, its contents are marked as clean. However, when an operation changes some aspect associated with the entry (such as the controller changes a memory location), the change is made within the cache and that cache entry marked as dirty. In this way, when the controller commands that the second area (used for the temporary data cache) is reclaimed, none of the values in the entries of the temporary data cache need to be stored since they are already stored in a separate portion of the storage device (such as in flash). The controller may maintain clean entries in the temporary data cache in one of several ways, including: prioritizing eviction of clean entries over dirty entries in the permanent data cache (including selecting a dirty entry from the permanent data cache and writing the selected dirty entry to non-volatile memory); determining whether an entry in the temporary data cache is to be modified, and if so, move the entry to location different from the temporary data cache (such as to the permanent data cache) for modification.

The controller may include one or more controller functions, such as memory management functions and cache management functions. Memory management functions control the assignment of the one or more portions of the volatile memory, such as allocating a portion for temporary data cache or for reclaiming the portion allocated to temporary data cache for another purpose. Cache management functions control searching and managing of the entries in the two separate data caches (such as the permanent data cache and the temporary data cache). For example, the controller may prioritize eviction of certain types of entries from one or both of the separate data caches.

According to a second aspect of the invention, a method for managing at least one memory in a storage device is disclosed. The method includes: allocating a first area in the at least one memory as a first data cache for caching data of a first data type; allocating a second area in the at least one memory as a second data cache for caching data of the first data type, the second data cache being separate from the first data cache and being a temporary data cache; and reclaiming the second area in the at least one memory for use other than for caching data of the first type. For example, the first area may be allocated as a permanent data cache and the second area may be allocated as a temporary data cache, with both the permanent data cache and temporary data cache being for the first type of data (such as control data or host data). The second area may be allocated for the temporary data cache if the second area is not being used. The second area (used for the temporary data cache) may be a shared memory region, and may be allocated as the temporary data cache or for another purpose (such as buffering, transferring, etc.).

The method may further include managing entries in the temporary data cache so that the entries in the temporary data cache are clean. In this way, when the second area (used for the temporary data cache) is reclaimed, none of the values in the entries of the temporary data cache need to be stored since they are already stored in a separate portion of the storage device (such as in flash). The temporary data cache may have its entries maintained as clean in one of several ways, including: prioritizing eviction of clean entries over dirty entries in the permanent data cache (including selecting a dirty entry from the permanent data cache and writing the selected dirty entry to non-volatile memory); determining whether an entry in the temporary data cache is to be modified, and if so, move the entry to location different from the temporary data cache (such as to the permanent data cache) for modification.

BRIEF DESCRIPTION OF THE DRAWINGS

FIGS. 5A-B is an exemplary flow diagram illustrating operation of a cache management functions for a permanent data cache and a temporary data cache.

BRIEF DESCRIPTION OF THE PRESENTLY PREFERRED EMBODIMENTS

Figure 1:
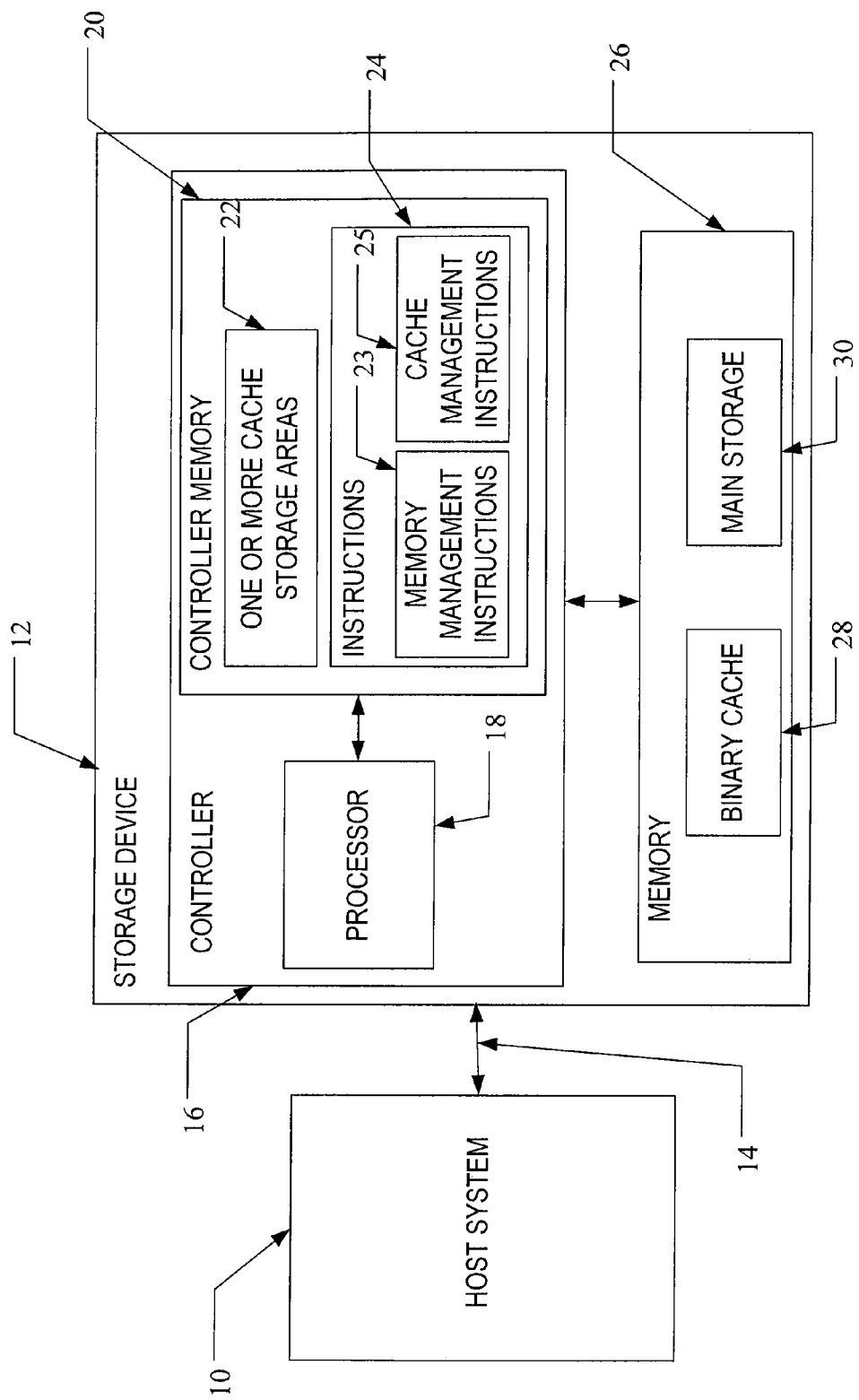
FIG. 1 is a block diagram of a self-caching memory system.
Figure 2:
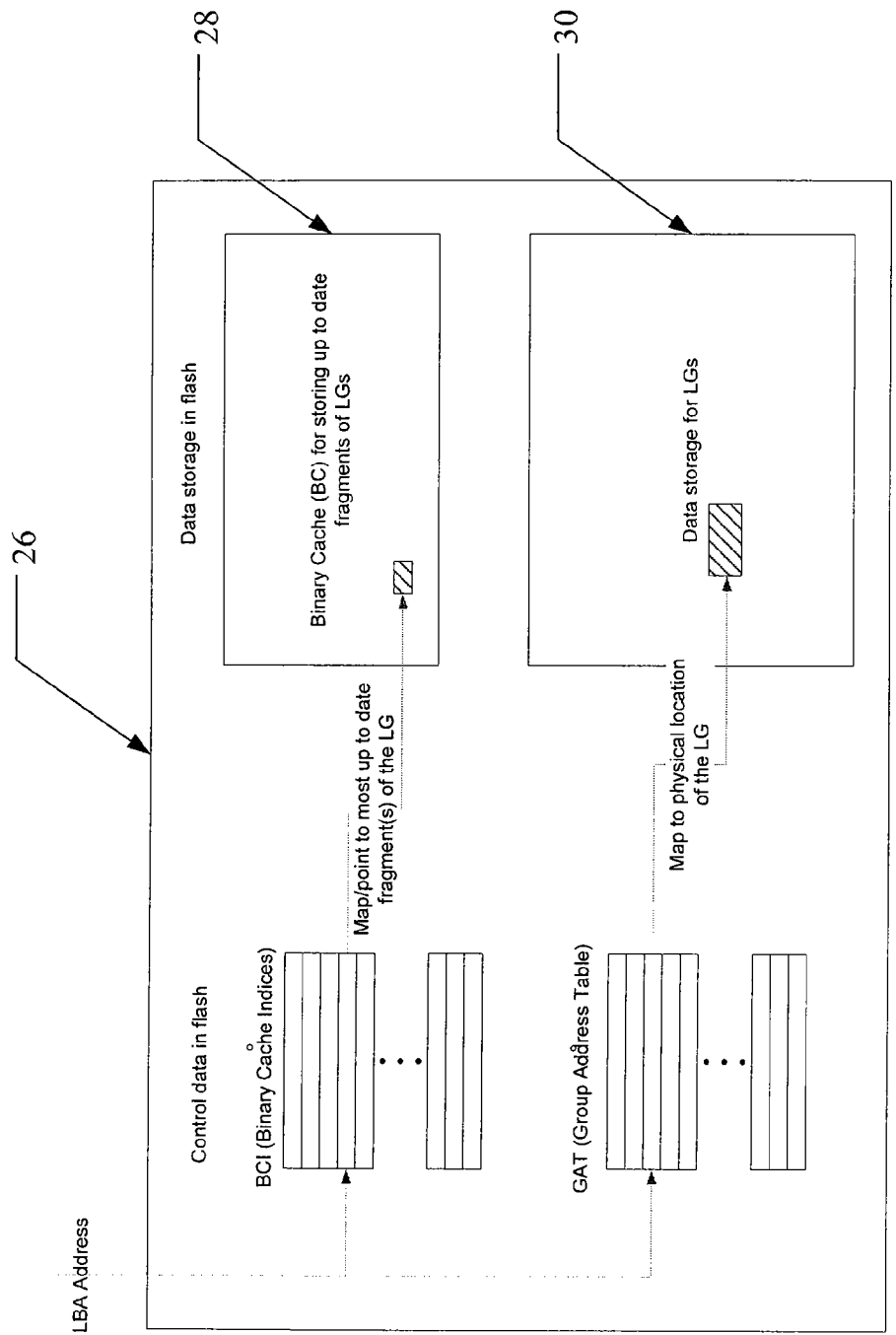
FIG. 2 is a block diagram of a memory within the self-caching memory system.

A flash memory system suitable for use in implementing aspects of the invention is shown in FIG. 1. A host system 10 stores data into, and retrieves data from, a self-caching storage device 12. The storage device 12 may be embedded in the host system 10 or may exist in the form of a card or other removable drive that is removably connected to the host system 10 through a mechanical and electrical connector. The host system 10 may be any of a number of data generating devices, such as a personal computer, a mobile telephone, a personal digital assistant (PDA), or the like. The host system 10 communicates with the storage device over a communication channel 14.

The storage device 12 contains a controller 16 and a memory 26. As shown in FIG. 1, the controller 16 includes a processor 18 and a controller memory 20. The processor 18 may comprise a microprocessor, a microcontroller, an application specific integrated circuit (ASIC), a field programmable gate array, a logical digital circuit, or other now known or later developed logical processing capability. The controller memory 20 may include volatile and/or non-volatile memory, and may include one or more cache storage areas 22 (such as one or more permanent cache storage areas and one or more temporary cache storage areas) and instructions 24. In an alternate embodiment, the one or more cache storage areas 22 (such as one or more volatile memories) may be located in a memory separate from the controller 16.

The memory 26 may include non-volatile memory (such as flash memory). As illustrated in FIG. 1, memory 26 may include binary cache 28 (which may include SLC type of flash configuration) and main storage 30 (which may include MLC type of flash configuration).

As discussed in more detail below, the one or more cache areas 22 may store part (or all) of control data stored in memory 26 (such as part or all of binary cache indices and/or group allocation table (GAT)). The processor 18 may execute instructions (such as instructions 24 resident in controller memory 20) and use one or more tables (such as a logical block to physical block translation table).

The storage device 12 may include the functions for a memory management. In operation, the processor 18 may execute memory management instructions 23 (which may be resident in instructions 24) for operation of the memory management functions, such as detailed in FIG. 4. The memory management functions may control the assignment of the one or more portions of the memory within storage device 12, such as within controller memory 20. For example, memory management functions may allocate a RAM portion of controller memory 20 for permanent data cache, may allocate a RAM portion of controller memory 20 for temporary data cache, or may reclaim the RAM portion allocated to temporary data cache for another purpose. One, some, or all of the functions of the memory management functions may be performed by one or separate elements within the storage device 12. For example, allocating memory regions for temporary data cache may be performed by Media Management Layer (MML) firmware, and reclaiming a temporary data cache may be performed by Data Path Layer (DPL) firmware.

One or more types of data may be cached in storage device 12. One type of data that may be cached in storage device 12 is host data, which is data sent to or received from the host system 10. Another type of data that may be cached in storage device 12 is control data. Other types of data for caching are contemplated.

Control data may include data related to managing and/or controlling access to data stored in memory 26. The binary cache 28 may store up-to-date fragments of the logical groups (LGs). The main storage may comprise the data storage for the LGs. Control data may be used to manage the entries in memory, such as entries in binary cache 28 and main storage 30. For example, a binary cache index (BCI) may receive a Logical Block Address (LBA), and may map/point to the most up to date fragment(s) of the LG in binary cache 28. The GAT may receive the LBA address and map to the physical location of the LG in the main storage 30.

The processor 18 (executing the memory management instructions 23) may assign one or more portions in memory (such as volatile memory) for caching of the one or more types of data. For example, the processor 18 may assign or allocate portions of volatile memory in controller memory 20 as one or more cache storage areas 22, as discussed in more detail below. The one or more cache storage areas 22 may include a portion (or all) of the BCI and GAT that is stored in memory 26.

The processor 18 may assign an area of volatile memory as a "permanent" cache storage area, which is an area that cannot be reclaimed by the processor 18 for a different purpose (such as for caching of a different type of data). The processor 18 may also assign an area of volatile memory as a "temporary" cache storage area, which is an area that can be reclaimed by the memory management functions for a different purpose (such as for caching of a different type of data). As discussed in more detail with respect to FIG. 4, the processor 18 may determine whether there is a storage area available for use as a temporary data cache area. If so, the processor 18 may assign the available storage area for use as the temporary data cache area. The available storage area may be used as the temporary data cache area until the available storage area is reclaimed for another purpose.

As one example, the processor 18 may assign one or more cache storage areas for host data. In one embodiment, the processor 18 may assign a permanent cache storage area for host data and a temporary data cache storage area for host data. In this way, caching for the host data may have two distinct and separate areas (or two different levels) with the permanent cache storage area for host data and the temporary cache storage area for host data. In an alternate embodiment, the processor 18 may assign a first temporary cache storage area for host data and a second temporary cache storage area for host data. The first temporary cache storage area for host data may differ from the second temporary cache storage area for host data in one or more ways, such as in the portion or size of memory from which the temporary cache storage area is assigned and/or the circumstances under which the temporary cache storage area is reclaimed. Using the two different data caches (such as two different levels of data cache stored in volatile memory) may improve system performance, such as the data cache hit rate. Further, the temporary data cache may be created from unused or over-provisioned parts of volatile memory. In this way, the storage device 12 may more efficiently use its volatile memory.

As another example, the processor 18 may assign one or more cache storage areas for control data. In one embodiment, the processor 18 may assign a permanent cache storage area for control data and a temporary cache storage area for control data. Likewise, caching for the control data may have two distinct and separate areas (or two different levels) with the permanent cache storage area for control data and the temporary cache storage area for control data. In an alternate embodiment, the processor 18 may assign a first temporary cache storage area for control data and a second temporary cache storage area for control data.

The storage device 12 may further include functions for cache management. In operation, the processor 18 may execute cache management instructions 25 (which may be resident in instructions 24) for operation of the cache management functions, such as detailed in FIGS. 5A-B. The cache management functions may control searching and managing of the entries in the one or more cache storage areas 22 resident in the storage device 12. In particular, the cache management functions may prioritize eviction of certain types of entries from one or both of the separate data caches. For example, the processor 18 (executing the cache management instructions 25) may manage two separate data caches, such as the permanent data cache and the temporary data cache, as discussed in more detail below with respect to FIGS. 4A-B.

Figure 3:
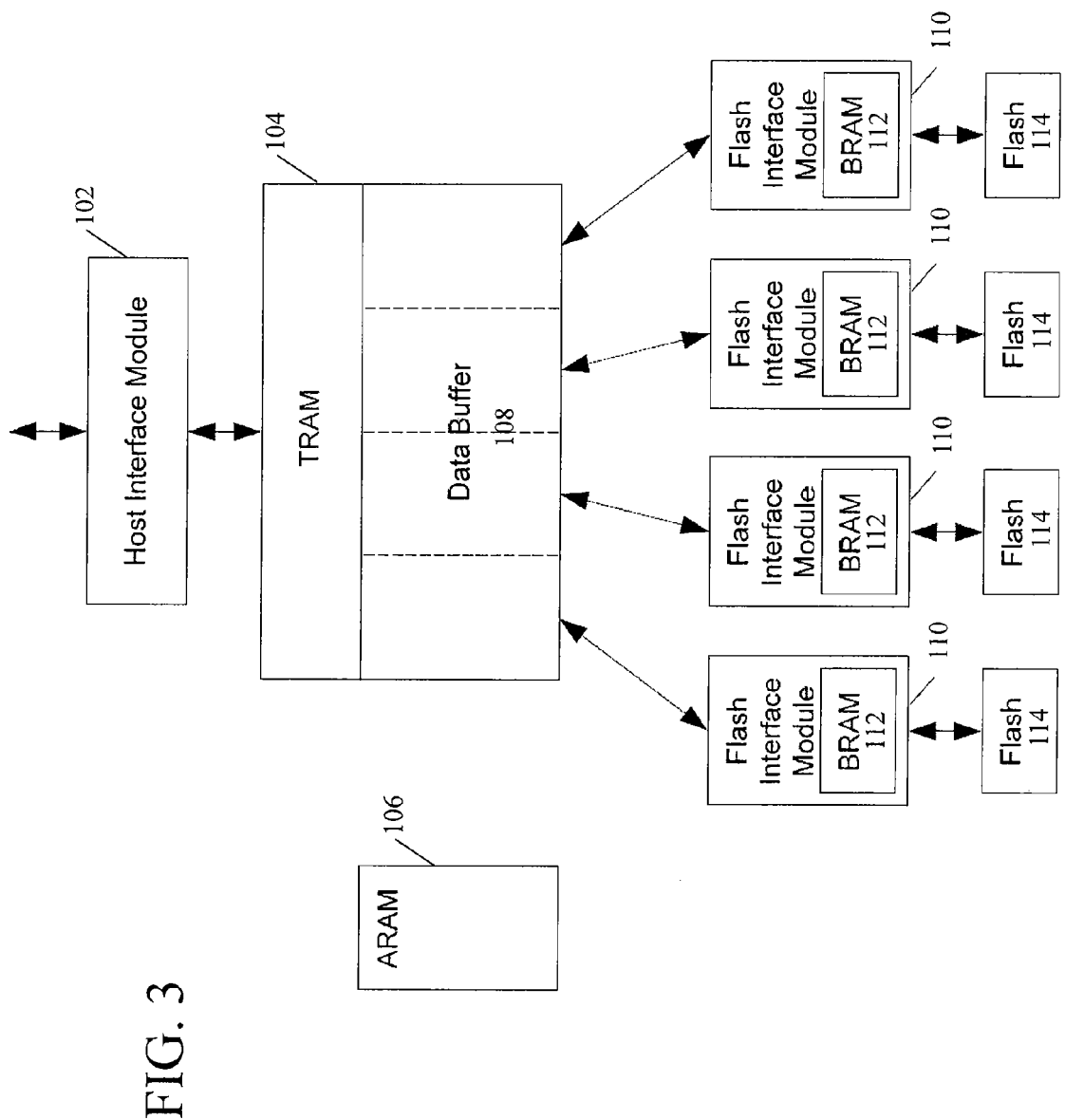
FIG. 3 illustrates a block diagram of an exemplary flash controller design.

FIG. 3 illustrates a more detailed block diagram of certain elements of controller 16 of FIG. 1, and is one example of a flash controller design. The flash controller design includes a host interface module 102 that provides the physical and electrical interface to the host system 10. The flash controller design may further include one or more volatile memories. As shown in FIG. 3, flash controller design includes multiple volatile memories, such as transfer RAM (TRAM) 104, buffer RAM (BRAM) 112, and argument RAM (ARAM) 106. The examples of ARAM, BRAM and TRAM are merely for illustration purposes only. Fewer or greater numbers of volatile memories may be used. Further, other types of RAM or different combinations of RAM may be used.

ARAM 106 may be RAM provisioned for control data caching. In this way, ARAM 106 may be considered a permanent control data caching area. For example, ARAM 106 may contain group allocation table (GAT) page cache and a logical group (LG) bit map cache. As discussed previously, part or all of the control data stored in cache flash in memory 26 may be stored in cache RAM in controller 16 to improve operation speed. For narrow logical block address (LBA) random read test or less, the permanent LG bit map cache may reduce control read (BCI or GAT page control read) to 1 control read per random read in steady state.

TRAM 104 includes a data buffer 108 that is provisioned for host data caching for host data to/from flash 114. In this way, TRAM 104 may be considered a permanent host data caching area. The flash memory 114 may be divided into one or more different portions (such as four portions as illustrated in FIG. 3), with each portion being associated with a different flash interface module 110, and a different section of data buffer 108. More or fewer portions of flash memory 114 may be used. The flash interface module 110 may include BRAM 112, which may be provisioned for error handling and/or chip-to-chip copy.

As discussed in more detail below, the temporary data cache may be located in one or multiple shared memory regions, such as TRAM 104 or BRAM 112. Using the temporary data cache may improve operation of the storage device. For full LBA range random read test, the caching of LG bit map in the temporary cache may reduce control read (BCI) to approximately one control read per random read in steady state. For narrow LBA range random read test, the caching of GAT pages in the temporary cache will reduce control read (GAT read) to approximately zero control read/random read in steady state.

Figure 4:
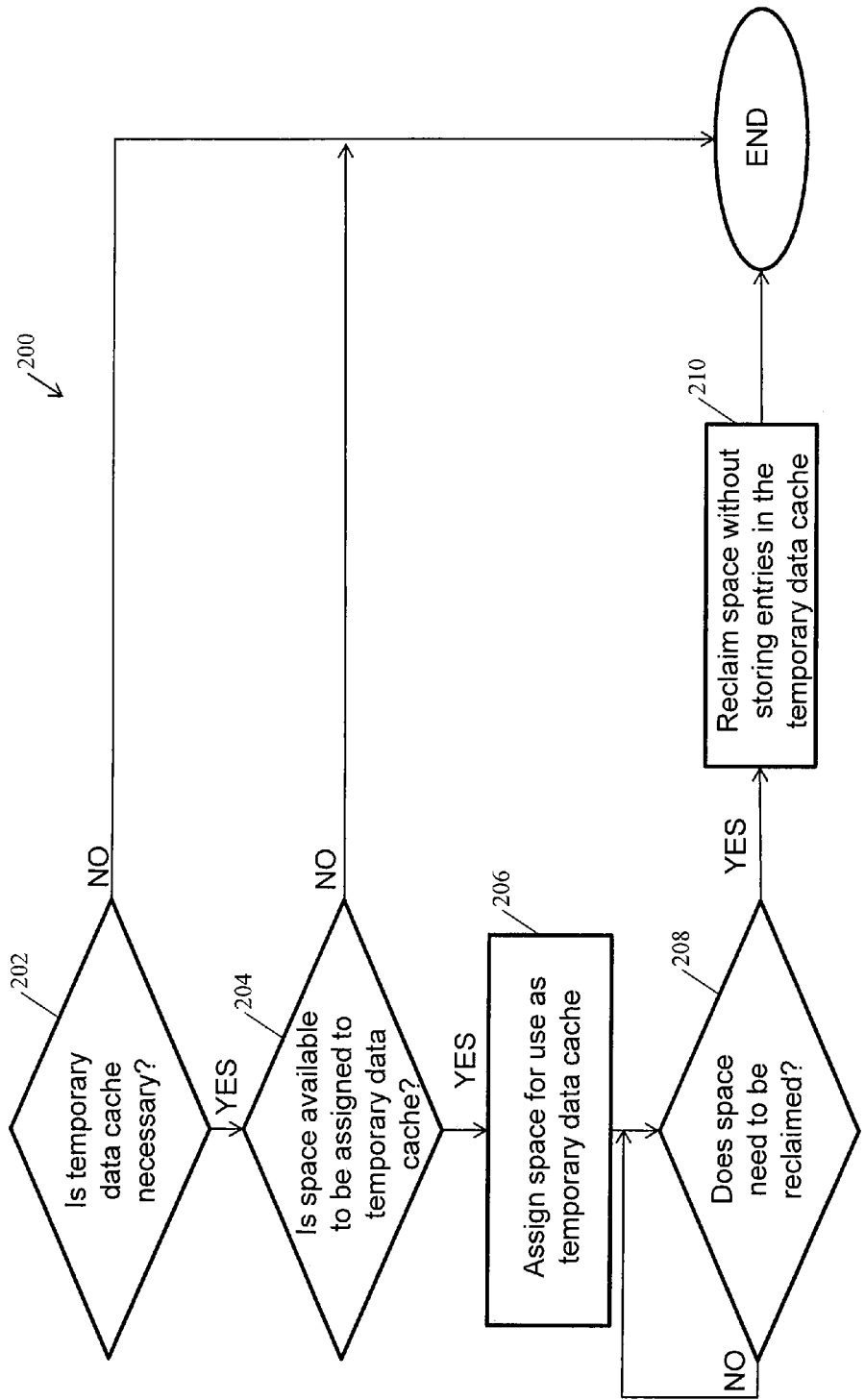
FIG. 4 is an exemplary flow diagram illustrating operation of a memory management functions.

FIG. 4 is an exemplary flow diagram 300 illustrating operation of the memory management functions. As discussed above, a temporary data cache may be assigned depending on whether memory space is available for use and/or whether the temporary data cache is necessary. One or more types of data may be assigned a temporary data cache (such as control data or host data). As discussed in more detail below with respect to FIGS. 4A-B, use of the temporary data cache allows for the size of the permanent data cache to be smaller since the temporary data cache may be used for instances where additional cache is required. For example, using a temporary data cache as part of the control data cache improves performance of particular read/writes traffic types that are prevalent in SSD applications.

At 202, the processor 18 (executing the memory management instructions 23) may optionally determine whether a temporary data cache is necessary. As discussed above, one or more types of data may be cached, such as control data and host data. If a temporary data cache is necessary, the processor 18 determines whether there is space available to be assigned to a temporary data cache, as shown at 204. In the example shown in FIG. 3, the processor 18 may determine whether there is space available in one of the volatile memories, such as in TRAM 104. If the space is available, at 206, the processor 18 may assign space for use as a temporary data cache. In the example shown in FIG. 3, the processor 18 may assign a portion of data buffer 108 to a temporary data cache, such as a temporary data cache for control data. At 208, the processor 18 determines if the space needs to be reclaimed. In the example shown in FIG. 3, if TRAM 104 needs a portion of the data buffer 108 assigned as the temporary data cache for control data, the processor 18 may determine to reclaim the portion assigned. If so, at 210, the processor 18 reclaims the space without storing the entries in the temporary data cache. As discussed in more detail with respect to FIGS. 5A-B, the temporary data cache is populated with clean entries, so that the entries are stored in another part of the storage device 12 and therefore do not need to be copied elsewhere when the space associated with the temporary data cache is reclaimed.

Figure 5B:
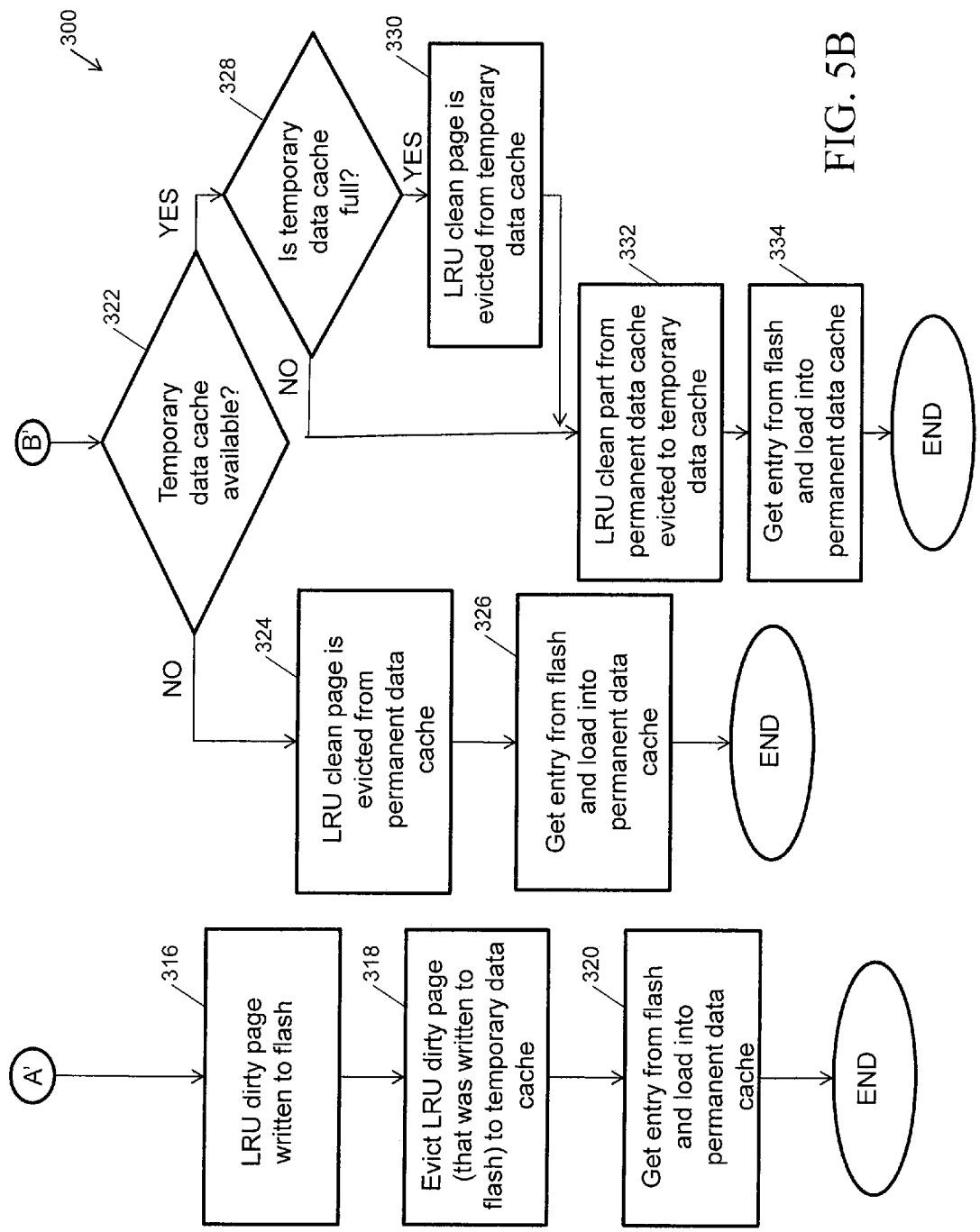

FIGS. 5A-B is an exemplary flow diagram 300 illustrating operation of a cache management functions for a permanent data cache and a temporary data cache (if present). The processor 18 (executing the cache management instructions 25) manages the entries in the temporary data cache so that all of the entries in the temporary data cache are clean. As discussed above, different types of data may be cached. In particular, a temporary data cache may be created for control data, and a temporary data cache may be created for host data. For example, a permanent GAT page cache may be used, with the permanent GAT page cache potentially containing dirty and clean entries, and the temporary GAT page cache containing clean entries only. As discussed in more detail below, since a LG bit map entry is built on the fly and does not have a backup copy in the flash, all LG bitmap is clean. A LG bitmap cache miss results in a new cache entry allocated in the permanent data cache. If the permanent data cache is full, a cache entry is evicted from the permanent data cache to the temporary data cache. If the temporary data cache is full, then a cache entry from the temporary data cache is evicted.

At 302, the processor 18 determines whether an entry is in the permanent data cache. If the entry is in the permanent data cache, the entry is retrieved from the permanent data cache. If not, at 304, the processor 18 determines whether the entry is in the temporary data cache.

A Logical Group Binary Cache bitmap (LG BC bitmap) may be used to determine if a fragment of a Logical Group is in the binary cache or not. The LG BC bitmap is discussed in application Ser. No. 61/487,215 entitled "FAST TRANSLATION INDICATOR TO REDUCE SECONDARY ADDRESS TABLE CHECKS IN A MEMORY DEVICE", filed on May 18, 2011, incorporated by reference herein in its entirety. If a fragment is present in the BC per the LG BC bitmap, a BCI (binary cache index) lookup is performed. If the corresponding BCI is not cached in the RAM (such as either in the temporary data cache for BCI or the permanent data cache for BCI in RAM), then a flash control read for the missing BCI is required. If the LG does not have any fragments in the BC per the LG BC bitmap, then a GAT (Group Address Translation table) lookup is performed. If the corresponding GAT entry is not cached in the RAM (such as either in the temporary data cache for GAT or the permanent data cache for GAT in RAM), then a flash control read for the missing GAT entry is performed.

If the entry is in temporary data cache, at 306, the processor 18 determines whether the operation for which the entry is accessed will modify the entry, which impacts whether the entry is "clean". A "clean" entry accurately reflects the contents of another part of the memory on the storage device (such as flash or other non-volatile memory) and whereas a "dirty" entry does not accurately reflect the contents of another part of the memory on the storage device. Because the entries in the temporary data cache are clean, reclaiming the area of the temporary data cache is easier. If the operation modifies the entry, then the entry is not considered clean, so that at 308 the entry is fetched from the temporary data cache and moved to the permanent data cache. Thus, the entries within the temporary data cache can remain clean. As discussed in more detail below, the entries in the temporary data cache are maintained as clean, so that the contents of the entries are located elsewhere in the storage device 12. In this way, there is a duplicate of the entries that are located in the temporary data cache. Reclaiming the area assigned to the temporary data cache is made easier since the entries stored in the temporary data cache need not be copied elsewhere (since they are already stored elsewhere in the storage device 12). Rather, the processor 18 may reclaim the space without the need to store the entries in the temporary data cache, as discussed above at 210 of FIG. 4.

In the example of a GAT cache, on a cache miss in the permanent data cache and a cache hit in the temporary data cache, if the operation will modify the GAT entry, the GAT entry will be fetched from the temporary data cache and loaded into the permanent data cache. If the operation will not modify the GAT entry, then the GAT entry may remain in the temporary data cache. In addition, the same eviction policies such as described in blocks 318 and 330 may be used. Optionally, if temporary buffer space is available for GAT entries swapping, the same GAT entry eviction policy from the permanent data cache such as described in blocks 318 and 330 may be used.

If the entry is not in the permanent data cache or in the temporary data cache, the processor 18 determines if the permanent data cache is full. If not, space is available in the permanent data cache for addition of the entry. So that, at 312, the entry is added to the permanent data cache. For example, if the permanent GAT cache is not full, the corresponding GAT page will be fetched from the flash and loaded into the permanent data cache.

If the permanent data cache is full, at 314, it is determined whether at least a part of the permanent data cache is clean. If so, at 322, the processor 18 determines if a temporary data cache is available (i.e., if there is space allocated for a temporary data cache). If there is no temporary data cache available, space is made available in the permanent data cache by evicting one or more pages. For example, at 324, the least recently used (LRU) clean page is evicted from the permanent data cache. The LRU algorithm may analyze the clean pages in the permanent data cache for recent use, and select for eviction the clean page that has not been used for the longest period of time. The LRU algorithm is merely one example of a methodology for the processor. Other methodologies are contemplated, such as the least frequently used (LFU) algorithm may analyze the clean pages in the permanent data cache for frequency of use, and select for eviction the clean page in the permanent data cache that has been least frequently used. At 326, the entry is obtained from flash memory and loaded into the permanent data cache.

For example, if the permanent GAT cache is full and at least one page in the permanent GAT cache is clean, and no temporary GAT cache available: the LRU clean GAT page may be evicted and the corresponding GAT page will be fetched from the flash and loaded into the permanent GAT cache.

If temporary data cache is available, at 328, the processor 18 determines whether the temporary data cache is full. If the temporary data cache is full, space is made available in the temporary data cache by evicting one or more pages. For example, at 330, the LRU clean page is evicted from the temporary data cache. Alternatively, another methodology is used to evict a page from the temporary data cache, such as the LFU algorithm.

A part of the permanent data cache is then evicted to another part of the storage device 12, such as evicted to the temporary data cache. For example, at 332, the LRU clean part from permanent data cache is evicted to temporary data cache. Alternatively, another algorithm, such as the LFU clean part from the permanent data cache is evicted to the temporary data cache. At 334, the entry is obtained from flash memory and loaded into the permanent data cache.

In the example of a GAT cache, if the permanent GAT cache is full and at least one page of the permanent GAT cache is clean, and a temporary GAT cache is available: the LRU GAT page is evicted from the temporary GAT cache (if it is full); the LRU clean GAT page from the permanent GAT cache is evicted to the temporary GAT cache; and the corresponding GAT page is fetched from the flash and loaded into the permanent GAT cache.

If the permanent data cache is full and dirty, one or more pages are copied from the permanent data cache to flash. For example, at 316, the LRU dirty page in the permanent data cache is copied to flash. Alternatively, another algorithm, such as LFU, may be used to copy a dirty page from permanent data cache to flash. Then, at 318, the page copied from the permanent data cache is evicted to the temporary data cache. At 320, the entry is obtained from flash memory and loaded into the permanent data cache. Thus, similar to 326 and 344, the flash read is loaded into permanent data cache. In this way, the management of the two levels of cache (permanent and temporary) prioritizes moving the newest entries to the permanent data cache. So that, the permanent data cache may be examined before the temporary data cache.

In the example of a GAT cache, if the permanent GAT cache is full and dirty, the LRU dirty page will be written to the flash and optionally (if present) evicted to the temporary GAT cache as a clean entry, and the corresponding GAT page will be fetched from the flash and loaded into the permanent GAT cache. If the temporary data cache would contain dirty entries, there would be a need to write the dirty entries to the flash before releasing the temporary. However, because management of the temporary data cache results in all of the entries in the temporary data cache being clean, the temporary data cache may be released instantly (without the necessity of copying any entries). One way to accomplish this is by ensuring that only clean entries are moved from the permanent data cache to the temporary data cache.

Figure 6:
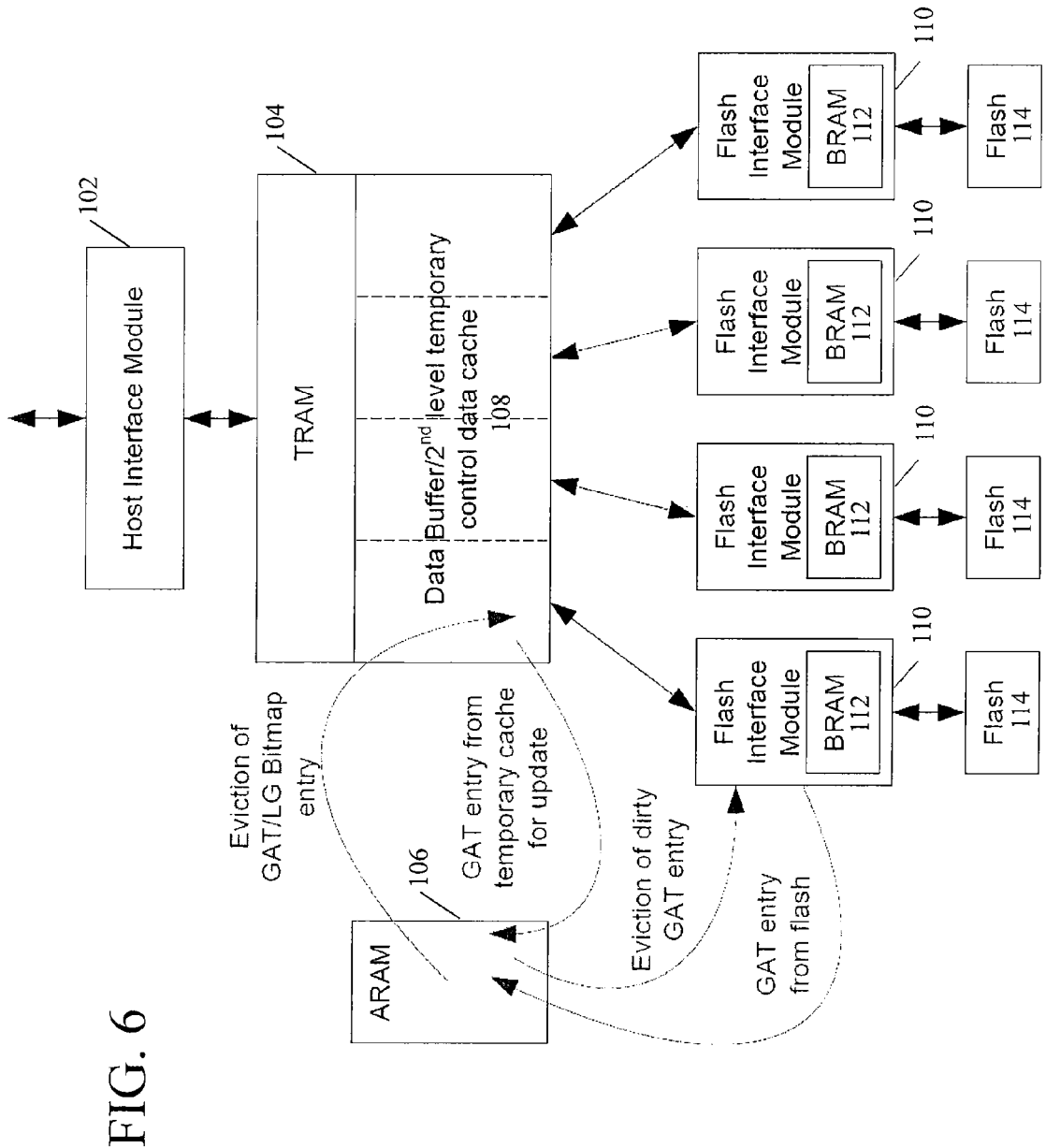
FIG. 6 illustrates the block diagram of FIG. 3 with flow of data from different volatile memories.

FIG. 6 illustrates the block diagram of FIG. 3 with flow of data from different volatile memories. ARAM 106 is RAM that is provisioned for control data caching. This may be considered the first level of control data caching. TRAM 104 is RAM that is provisioned for data buffer and host data caching. In the event that TRAM 104 has additional space not being used for data buffer and host data caching, a part of the TRAM 104 may be designated as a temporary control data cache. This may be considered the second level of control data caching. FIG. 6 illustrates various actions, such as the eviction of GAT/LG Bitmap entry from ARAM 106 to TRAM 104, the eviction of a dirty GAT entry from ARAM 106 to flash, sending of a GAT entry from flash to ARAM 106, and sending of a GAT entry from temporary data cache to ARAM 106 for update.

As disclosed above, a portion of memory in the storage device may be used for temporary data cache so that two levels of cache may be used (such as a permanent data cache and a temporary data cache). The storage device may manage the temporary data cache in order to maintain clean entries in the temporary data cache. In this way, the storage area associated with the temporary data cache may be immediately reclaimed and retasked for a different purpose without the need for extraneous copy operations.

It is intended that the foregoing detailed description be understood as an illustration of selected forms that the invention can take and not as a definition of the invention. It is only the following claims, including all equivalents, that are intended to define the scope of this invention.

We claim:

1. A storage device comprising:
at least one memory;
a controller in communication with the at least one memory and configured to:
access a first area in the at least one memory as a first data cache;
allocate a second area in the at least one memory as a temporary data cache for caching data, the temporary data cache being separate from the first data cache;
prioritize clean entries over dirty entries in the temporary data cache;
in response to determining to free space in the first data cache, prioritize dirty entries over clean entries in the first data cache by prioritizing eviction of clean entries over dirty entries from the first data cache; and
reclaim at least a part of the second area in the at least one memory for use other than for the temporary data cache.

2. The storage device of claim 1, wherein the first data cache comprises a permanent data cache.

3. The storage device of claim 1, wherein the at least one memory comprises a first volatile memory and a second volatile memory, the first volatile memory being separate from the second volatile memory;
wherein the first area is in the first volatile memory; and
wherein the controller is configured to allocate the second area in the second volatile memory.

4. The storage device of claim 3, wherein the controller is further configured to determine whether the second area is not being used;
wherein, in response to determining that the second area is not being used, the controller is configured to allocate the second area as the temporary data cache;
wherein, after the controller is configured to allocate the second area as the temporary data cache, the controller is further configured to determine that the second area needs to be used for a purpose other than for use as a temporary data cache; and
wherein, in response to determining that the second area needs to be used for a purpose other than for use as a temporary data cache, the controller is configured to reclaim the second area.

5. The storage device of claim 1, wherein the controller is configured to prioritize clean entries over dirty entries in the temporary data cache by:
determining whether a specific entry in the temporary data cache is to be modified resulting in a dirty entry; and
in response to determining that the specific entry is to be modified, evicting the specific entry from the temporary data cache.

6. The storage device of claim 5, wherein the first data cache is a permanent data cache; and
wherein the controller is configured to evict the specific entry from the temporary data cache by evicting the specific entry from the temporary data cache to the first data cache.

7. The storage device of claim 1, wherein the controller is configured to prioritize dirty entries over clean entries in the first data cache resulting in copying the clean entries from the first data cache to the temporary data cache.

8. The storage device of claim 1, wherein the controller is configured to determine whether the first data cache is full; and
wherein, in response to determining that the first data cache is full, the controller is configured to prioritize dirty entries over clean entries in the first data cache.

9. The storage device of claim 8, wherein, in response to determining that the first data cache is full, the controller is further configured to determine whether the temporary data cache is full.

10. The storage device of claim 9, wherein, in response to determining that the temporary data cache is full, the controller is configured to:
evict at one clean entry from the temporary data cache; and
evict the clean entries from the first data cache to the temporary data cache.

11. A method for managing at least one memory in a storage device, the method comprising:
access a first area in the at least one memory as a first data cache;
allocating a second area in the at least one memory as a temporary data cache, the temporary data cache being separate from the first data cache and being a temporary data cache;
prioritizing clean entries over dirty entries in the temporary data cache;

prioritizing dirty entries over clean entries in the first data cache by prioritizing eviction of clean entries over dirty entries from the first data cache; and reclaiming the second area in the at least one memory for use other than for the temporary data cache.

12. The method of claim 11, wherein the first data cache comprises a permanent data cache.

13. The method of claim 11, wherein the at least one memory comprises a first volatile memory and a second volatile memory, the first volatile memory being separate from the second volatile memory;
wherein the first area is in the first volatile memory; and
wherein the second area is allocated in the second volatile memory.

14. The method of claim 13, further comprising determining whether the second area is not being used;
wherein, in response to determining that the second area is not being used, the second area is allocated as the temporary data cache;
wherein, after the second area is allocated as the temporary data cache, further comprising determining that the second area needs to be used for a purpose other than for use as a temporary data cache; and
wherein, in response to determining that the second area needs to be used for a purpose other than for use as a temporary data cache, reclaiming the second area.

15. The method of claim 11, wherein prioritizing clean entries over dirty entries in the temporary data cache comprises:
determining whether a specific entry in the temporary data cache is to be modified resulting in a dirty entry; and
in response to determining that the specific entry is to be modified, evicting the specific entry from the temporary data cache.

16. The method of claim 15, wherein the first data cache is a permanent data cache; and
wherein evicting the specific entry from the temporary data cache comprises evicting the specific entry from the temporary data cache to the first data cache.

17. The method of claim 16, wherein prioritizing clean entries over dirty entries in the temporary data cache comprises:
determining whether the first data cache is full; and
in response to determining that the first data cache is full, evicting clean entries from the first data cache.

18. The method of claim 17, wherein the first data cache is a permanent data cache; and
wherein evicting the clean entries from the first data cache comprises evicting the clean entries from the first data cache to the temporary data cache.

19. The method of claim 11, wherein prioritizing dirty entries over clean entries in the first data cache results in additional clean entries being stored in the temporary data cache.

20. The method of claim 11, further comprising determining whether the first data cache is full; and
wherein, in response to determining that the first data cache is full, dirty entries are prioritized over clean entries in the first data cache.

21. The method of claim 20, wherein, in response to determining that the first data cache is full, further comprising determining whether the temporary data cache is full.

22. The method of claim 21, wherein, in response to determining that the temporary data cache is full, evicting at one clean entry from the temporary data cache and evicting the clean entries from the first data cache to the temporary data cache.

23. A storage device comprising:
at least one memory;
a controller in communication with the at least one memory and configured to:
access a first area in the at least one memory as a permanent data cache;
allocate a second area in the at least one memory as a temporary data cache for caching data, the temporary data cache being separate from the first data cache;
prioritize clean entries over dirty entries in the temporary data cache;
prioritize dirty entries over clean entries in the first data cache; and
reclaim at least a part of the second area in the at least one memory for use other than for the temporary data cache,
wherein the controller is configured to prioritize clean entries over dirty entries in the temporary data cache by:
determining whether a specific entry in the temporary data cache is to be modified resulting in a dirty entry; and
in response to determining that the specific entry is to be modified, evicting the specific entry from the temporary data cache to the permanent data cache,
wherein the controller is configured to prioritize dirty entries over clean entries in the first data cache by:
determining whether the first data cache is full; and
in response to determining that the first data cache is full, evicting clean entries from the first data cache.

24. The storage device of claim 23,
wherein the controller is configured to evict the clean entries from the first data cache by evicting the clean entries from the first data cache to the temporary data cache.

25. A storage device comprising:
at least one memory;
a controller in communication with the at least one memory and configured to:
access a first area in the at least one memory as a permanent data cache;
allocate a second area in the at least one memory as a temporary data cache for caching data, the temporary data cache being separate from the permanent data cache;
determine whether an operation will modify an entry in the temporary data cache;
in response to determining that the operation will modify the entry in the temporary data cache, move the entry to the permanent data cache;
determine whether to free space in the permanent data cache;
in response to determining to free space in the permanent data cache, evict one or more clean entries from the permanent data cache; and
reclaim at least a part of the temporary data cache without copying any part of the temporary data cache.

26. The storage device of claim 25, wherein the controller is configured to evict the one or more clean entries from the permanent data cache by evicting the one or more clean entries to the temporary data cache.

* * * * *